March 8, 1932.  J. G. MORAN  1,848,372
AIRPLANE REFUELING DEVICE
Filed May 8, 1929  2 Sheets-Sheet 1
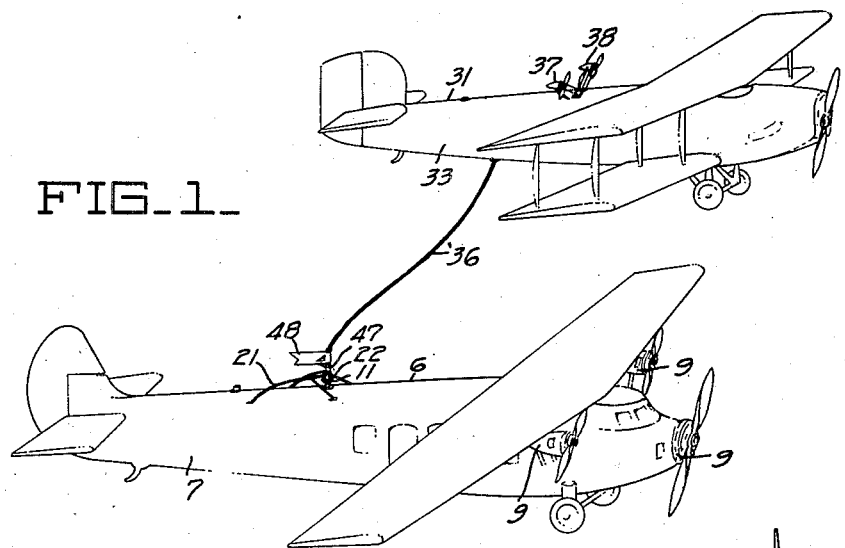
FIG_1_
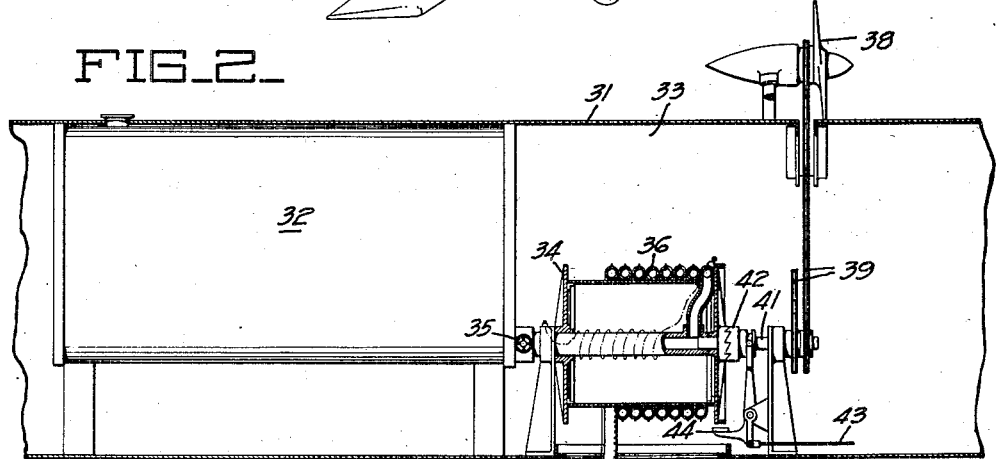
FIG_2_
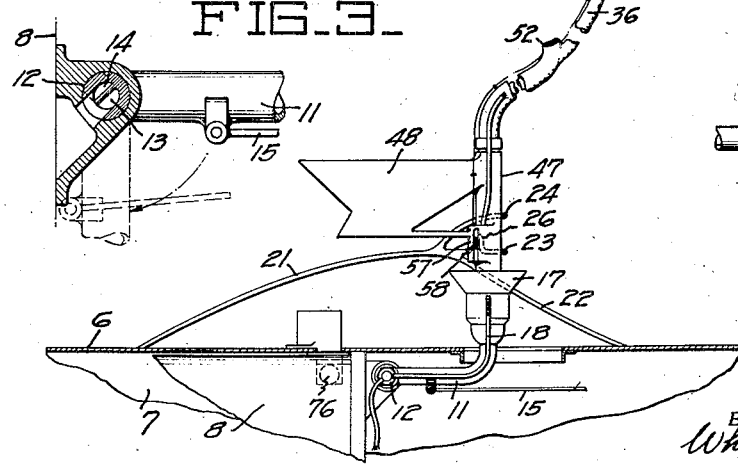
FIG_3_
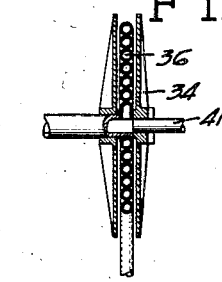
FIG_4.
INVENTOR
James G. Moran
BY
White, Prost & Fryer
ATTORNEYS March 8, 1932.  J. G. MORAN  1,848,372
AIRPLANE REFUELING DEVICE
Filed May 8, 1929  2 Sheets-Sheet 2
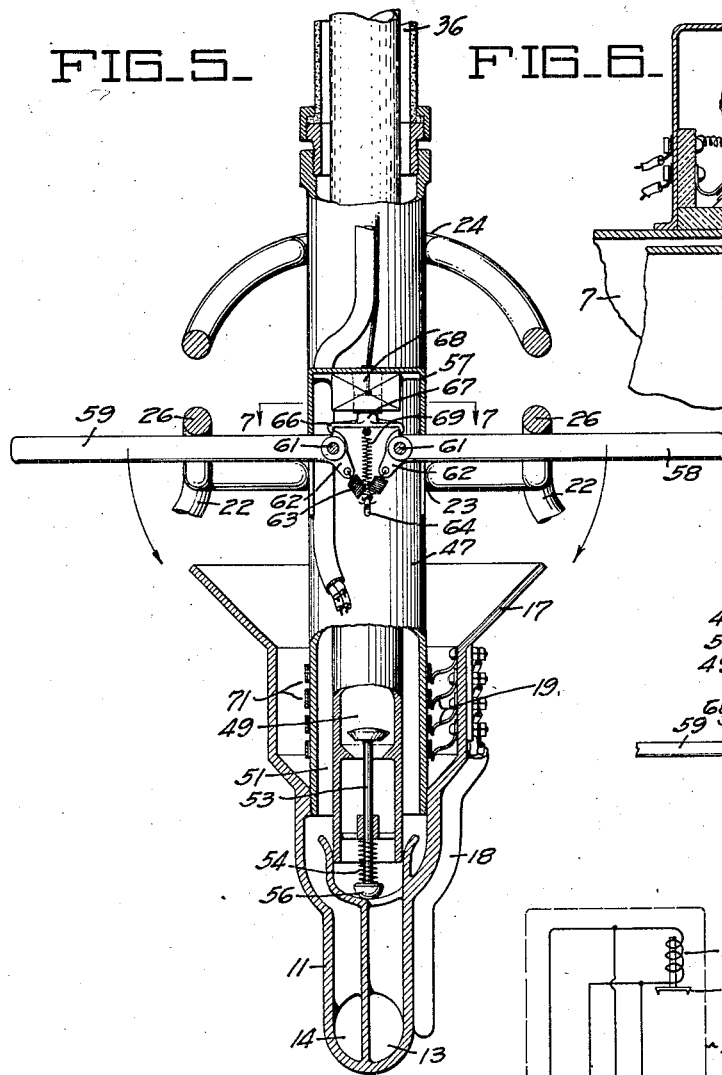
FIG_5_
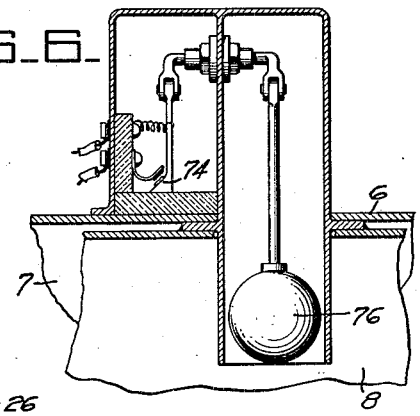
FIG_6_
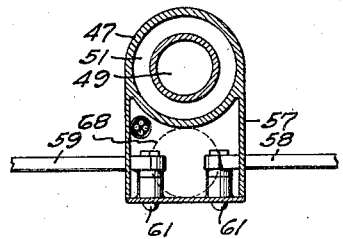
FIG_7_
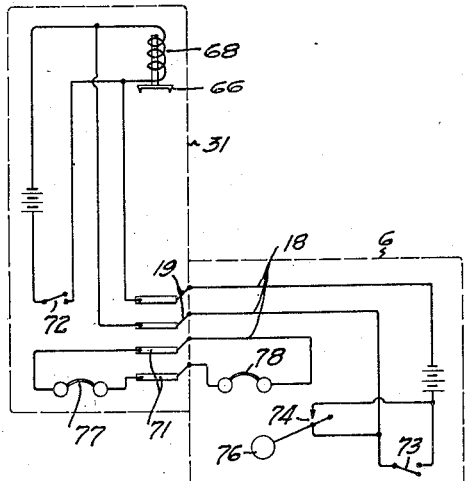
FIG_8_
INVENTOR
James G. Moran
BY
White, Prost & Fryer
ATTORNEYS Patented Mar. 8, 1932

1,848,372

UNITED STATES PATENT OFFICE

JAMES G. MORAN, OF MARTINEZ, CALIFORNIA

AIRPLANE REFUELING DEVICE

Application filed May 8, 1929. Serial No. 361,345.

My invention relates to means for replenishing the fuel supply in airplanes and particularly to means for establishing contact between a plurality of airplanes in flight.

An object of my invention is to insure a mechanical interconnection between two airplanes in flight so that fuel can be transferred from one to the other.

Another object of my invention is to establish simultaneously electrical communication between such airplanes so that the pilots thereof can be in verbal communication.

Another object of my invention is to provide a quick release of the mechanical inter-engagement of said airplanes the release being under the control of the pilots of both planes.

The foregoing and other objects are attained in the embodiment of the invention shown in the drawings, in which, Figure 1 is a perspective showing a pair of airplanes in communication by means of the refueling device of my invention.

Figure 2 is a longitudinal cross section on a vertical plane of portions of the two planes as they are interconnected.

Figure 3 is a cross section of the hinge joint of the fuel tank filler spout.

Figure 4 is a cross section of one form of reel.

Figure 5 is a composite view, portions being in section, of the end of the fuel line and of the tank filler spout in juxtaposition.

Figure 6 is a detail disclosing the fuel tank float control.

Figure 7 is a cross section on the line 7—7 of Figure 5.

Figure 8 is a wiring diagram showing the interconnection of two airplanes in accordance with my invention.

In its preferred form, the airplane refueling device of my invention comprises means for establishing a mechanically interlocked connection between a pair of airplanes in flight, together with means for simultaneously establishing electrical communication between the said airplanes and provided with means under the control of pilots of both airplanes for releasing the interlock engagement.

My refueling device preferably is applied to a pair of airplanes. The lower plane 6 is of the customary type provided with a hollow fuselage 7 in which is situated a fuel tank 8. The engines 9 of the airplane 6 consume fuel from the tank and it is to replenish such tank while airplane 6 is in flight that I provide my invention.

Preferably secured to tank 8 is a tank spout 11 pivoted at 12 by a shut-off connection. The spout is adapted to swing through approximately a right angle from off position as indicated by the dotted line in Figure 3 to on position as indicated by the solid line in Figure 3. The interior of the spout 11 is divided into two passageways 13 and 14. Passageway 13 is adapted to conduct fuel while 14 is designed to permit the egress of air from the tank as it is being filled. The spout 11 is provided with a control rod 15 under control of the pilot of airplane 6 so that the spout can readily be thrown from on position to off position and vice versa. The upper end of the spout is flared as at 17 to provide a wide opening. Conveniently affixed to the side of the spout are electric wires 18 terminating in a plurality of brushes generally designated as 19 mounted on the interior of the flared end 17. The electric wires 18 are preferably included in various circuits as will be later described.

Mounted on the fuselage of airplane 6 and disposed around the flared end 17 of the spout 11 when it is projected from the fuselage is a means for engaging a fuel line. This means preferably comprises a frame composed of curved bars 21 secured in a generally converging outline and provided with braces 22 for maintaining them in position. The bars not only converge toward the leading end of the airplane 6 but also rise from the fuselage simultaneously and terminate in a loop portion 23 of semi-circular contour. Vertically aligned with the loop portion is a second similarly contoured section 24 joined to the bars 21 and intermediate the two loop portions project relatively sharp vertical bends 26. These bends are in transverse alignment and have approximately parallel interior sides.

The foregoing is a general description of the special equipment provided on the lower airplane 6 which is to be refueled. The upper airplane 31 which carries the supply of additional fuel to be transferred preferably is of the usual type provided with a large fuel tank 32 situated in its fuselage 33. The tank gives onto a hose reel 34 which is suitably mounted in the interior of the fuselage and carries wound about it a fuel line 36 preferably of flexible tubing. Either the form of reel shown in Figure 2 or the form of reel shown in Figure 4 may be utilized. The reel 34 communicates with the interior of tank 32 through a quick acting valve 35 which is always open, except in emergencies, so that the line 36 is preferably filled with fluid.

To control the extent to which the fuel line is wound on the reel, I preferably provide a drive means therefor. This preferably includes a pair of air driven propellers 37 and 38 which are connected by suitable means 39 to a shaft 41. The shaft may be connected or disconnected to the drum 34 by a clutch 42 controllable by the airplane pilot through a control rod 43. Also controllable by rod 43 is a friction brake 44 engageable with the rim of the drum to hold it in any predetermined position. The arrangement of the clutch 42 and brake 44 is such that the drum can be operated in either one of three ways. The drum can be positively rotated by virtue of the air motors 37 and 38 to withdraw the hose 36 and coil it upon the drum. If the clutch and brake are both released the drum can revolve freely and ordinarily the weight of the line 36 is sufficient to cause the paying out thereof and reasonably rapid unwinding of the hose line. The third condition is for the brake 44 to be applied thereby holding firmly the drum in any desired position with a predetermined length of fuel line unwound.

While the force exerted by the air motors 37 and 38 is normally sufficient to retract the hose and wind it about the drum, the motors are nevertheless sufficiently yielding to permit a superior force to unwind the hose line from the reel and in any event during the engagement of the clutch while a portion of the hose is unwound exert sufficient force on the hose to keep it always under the requisite degree of tension. Not only does the hose line 36 carry a central conduit for fuel but it also carries electric wires for establishing telephonic communication and other circuits to be hereinafter described.

The lower or trailing end of hose 36 preferably is provided with a nozzle 47 which merges at its trailing edge with a wind vane 48 for imparting directional characteristics to the nozzle. The nozzle is preferably a metallic body having an inner passage 49 and an outer annular passage 51. The inner passage 49 communicates through the hose with the interior of the tank 32 while the outer annular passage 51 extends for a sufficient distance along the line and terminates in a vent 52. The terminal end of the interior passage 49 is preferably provided with a valve 53 normally retained on its seat by a coiled spring 54 to prevent the efflux of fuel from the interior of the line. The valve may be dislodged from its seat and the flow of fuel initiated by displacing the end 56 of the valve stem to lift the valve from its seat against action of spring 54. Mounted on the nozzle body 47 is a housing 57 in which are pivoted a pair of arms 58 and 59 normally spring pressed to extend radially outward in a perpendicular direction from the nozzle proper. Each of the arms is mounted on a pivot 61 and carries an apertured extension 62 connected by a coil spring 63 to an anchor 64.

The arms 58 and 59 may be latched in extended position by a trigger 66 mounted on the core 67 of a solenoid coil 68 disposed within the housing 57. The trigger is urged by a spring 69 toward the pivotal axes 61 of the arms 58 and 59 so that when the arms are in extended position the trigger is in engagement with the two arms and retains them so extended. Upon energization of the solenoid 68, the core 67 is lifted into the solenoid against the urging of spring 69 to release the trigger 66 from engagement with the two arms so that they are then free to be rotated through approximately 90° into substantial alignment with the axis of the nozzle and to be nested and received within the sides of the nozzle body. The lower end of the nozzle carries conducting rings generally designated as 71 adapted for engagement with the brushes 19, as will shortly be described. The trigger 66 is also automatically releasable when substantially all of the hose 36 is paid out by a metal tape 70 which is slightly shorter than the hose and is fastened to the trigger and to the drum 34.

In the use of the airplane refueling device of my invention, a pair of airplanes equipped as has been described fly in the relative positions shown in Figure 1. The airplane 31 is first operated by its pilot so that it gradually overtakes airplane 6. During this time the pilot of airplane 31 operates rod 43 to disengage clutch 42 and to leave brake 44 also disengaged. The weight of fuel line 36 together with the nozzle 47 is sufficient to cause the fuel line to unwind from drum 34 and to depend from the airplane 31. The fuel line therefore trails the requisite amount as controlled by the pilot of plane 31 and is held in suitable position by the wind vane 48. Airplane 31 is then flown immediately above airplane 6 and at a slightly greater speed so that the nozzle 47 with arms 58 and 59 extended and latched in position drags upon the upper part of the fuselage of airplane 6 and is drawn between bars 21. Slight further movement of the nozzle in a direction toward the leading edge of airplane 6 causes the extended arms 58 and 59 to lie below the converging bars 21 and to position the nozzle with respect to the lower airplane 6. Upon final forward movement of nozzle 47 the arms 58 and 59 are engaged with the semi-circular loops 23 and 24 so that the forward leading surface of the nozzle abuts the loops 23 and 24 and the nozzle is held in a vertical predetermined position largely under influence of the fuel line 36 which at this juncture is maintained under tension by virtue of engagement of clutch 42 with the driving wind motors 37 and 38. As soon as nozzle 47 is located in its predetermined position, the pilot of airplane 6 operates his lever 15 to lift the fuel tank spout 11 from off position to on position. This movement not only opens communication between the spout and tank 8 but also engages the flared end 17 with the depending end of nozzle 47. There is thus effected simultaneously a mechanical interlock connection between the two airplanes and as the flared portion of the spout 11 carrying contacts 19 comes into position with the lower end of the spout of the nozzle 47 and the rings 71 thereon there is also effected an electrical interconnection between the two planes for completing telephonic and other electric circuits. The final lifting movement of the spout 11 is effective to dislodge valve 53 from its seat so that the fuel contained in the passage 49 is free to flow through the passage 13 into the interior of fuel tank 8. At the same time air discharging from the tank 8, and which may also carry explosive fumes, is conducted through passage 14 and through vent conduits 51 to the outlet 52 which is a safe distance above the airplane 6.

After the connection is established between the two airplanes I provide sundry means for breaking the connection. As shown in Figure 8, the solenoid 68 which controls the trigger 66 for releasing the extended arms 58 and 59 is in circuit with a switch 72 under the control of the pilot of the upper airplane 31. The solenoid 68 is also in circuit with a switch 73 under control of the pilot of the lower airplane 6, so that either pilot upon closing his respective switch can operate the solenoid to free the arms 58 and 59 and permit the tension in fuel line 36 to withdraw the nozzle 47 from contact with the lower airplane 6. Any retracting movement of the nozzle permits the valve 53 to close immediately thereby shutting off the supply of fuel and preventing serious accident due to spillage thereof. As a further precaution, I preferably include in the circuit of solenoid 68 a switch 74 which is operated by a float 76 responsive to the level of fuel in tank 8, so that as the tank approaches its filled condition the float 76 rises and finally establishes the circuit so that the solenoid 68 is operated to free the extended arms 58 and 59 and interconnection between the two airplanes may be broken.

It will be noted in Figure 8 that telephones 77 and 78 situated in the two planes respectively are in communication upon establishment of mechanical interconnection between the nozzle 47 and the spout 11. Since the fuel line 36 is maintained under tension during the period of contact with the lower airplane 6 the arms 58 and 59 are always held sharply against their retaining bars 21 and undue and undesirable slack in the fuel line is precluded despite wide variation in relative vertical displacements of the two airplanes. Immediately however, upon energization of the solenoid 68 the two arms 58 and 59 are no longer maintained in their extended position and the nozzle 47 can immediately be withdrawn from its connection with airplane 6 and can be retracted into the fuselage of upper airplane 31. Upon the completion of the intercommunication between the two airplanes the spout 11 is withdrawn by the pilot of the lower plane into the fuselage which simultaneously closes the valve 12 to prevent spillage of fuel from the tank 8.

It will be appreciated that with the device of my invention there is provided a simple and accurate way of establishing intercommunication in a predetermined manner between the two airplanes in flight and not only for establishing mechanical interconnection therebetween but electrical communication as well. There is provided a large factor of safety against undue accidents and the connection between the two airplanes is under control of the pilot of either plane at all times so that in case of accident the connection can be immediately severed.

It is to be understood that I do not limit myself to the form of the airplane refueling device shown and described herein, as the invention, as set forth in the following claims may be embodied in a plurality of forms.

I claim:

1. An airplane refueling device comprising a pair of airplanes, means for establishing an obstructed conduit connection between said airplanes, and means for simultaneously clearing said obstructed conduit and establishing electrical contact between said airplanes.

2. An airplane refueling device comprising a pair of airplanes, a flexible line trailing from one of said airplanes, means on the other of said airplanes for guiding and engaging said line in a predetermined position, means under control of the pilot of said other plane for additionally engaging said line, means for simultaneously establishing electrical contact between said airplanes, and means under control of the pilots of both said airplanes for releasing the engagement of said line with said other plane.

3. An airplane refueling device comprising a pair of airplanes, a flexible conduit trailing from one of said airplanes, means on the other of said airplanes for interlocking said conduit in a predetermined position, and means on said first named airplane for automatically tensioning said conduit in said position.

4. An airplane refueling device comprising a pair of airplanes, an obstructed conduit trailing from one of said airplanes, means on the other of said airplanes for guiding and interlocking the trailing end of said obstructed conduit, and means under the control of the pilot of said other airplane for clearing said obstructed conduit.

5. An airplane refueling device comprising a pair of airplanes, means for establishing an obstructed conduit connection between said airplanes, means for simultaneously clearing said obstructed conduit and establishing electrical contact between said airplanes, and electrical means under control of the pilots of each of said airplanes for releasing said conduit connection and said electrical contact.

6. An airplane refueling device comprising a pair of airplanes, an obstructed fuel conduit trailing from one of said airplanes, an electric conductor associated with said fuel conduit, means on the other of said airplanes for guiding and engaging the trailing end of said conduit, and additional means on said other airplane for additionally engaging the trailing end of said conduit and for simultaneously clearing said obstructed conduit and establishing electrical contact between said airplanes.

In testimony whereof, I have hereunto set my hand.

JAMES G. MORAN.